(12) United States Patent
Antunes et al.

(10) Patent No.: US 7,037,071 B2
(45) Date of Patent: May 2, 2006

(54) DEVICE FOR MAINTAINING JOINTS WITH SEALING LEAVES

(75) Inventors: Serge Louis Antunes, Combs la Ville (FR); Patrick Pierre Bernard Gazeau, Bullion (FR); Marc Marchi, Le Mee (FR); Patrice Jean Marc Rosset, Le Mee sur Seine (FR)

(73) Assignee: Snecma Moteurs, Paris (FR)

( * ) Notice: Subject to any disclaimer, the term of this patent is extended or adjusted under 35 U.S.C. 154(b) by 70 days.

(21) Appl. No.: 10/489,306

(22) PCT Filed: Sep. 18, 2002

(86) PCT No.: PCT/FR02/03182

§ 371 (c)(1),
(2), (4) Date: Mar. 17, 2004

(87) PCT Pub. No.: WO03/025350

PCT Pub. Date: Mar. 27, 2003

(65) Prior Publication Data

US 2004/0239050 A1    Dec. 2, 2004

(30) Foreign Application Priority Data

Sep. 20, 2001  (FR) .................................. 01 12133

(51) Int. Cl.
*F01D 9/04* (2006.01)

(52) U.S. Cl. ................... 415/189; 415/191; 415/209.2; 415/209.3

(58) Field of Classification Search ................ 415/139, 415/135, 191, 209.2, 213.1, 189; 277/630, 277/637
See application file for complete search history.

(56) References Cited

U.S. PATENT DOCUMENTS

| 4,126,405 A | 11/1978 | Bobo et al. |
| 5,797,723 A | 8/1998 | Frost et al. |
| 6,418,727 B1 * | 7/2002 | Rice et al. .................... 60/799 |
| 6,464,232 B1 * | 10/2002 | Marchi et al. .............. 277/630 |

FOREIGN PATENT DOCUMENTS

| EP | 1002972 | 5/2000 |
| FR | 2649463 | 1/1991 |
| WO | 0171175 | 9/2001 |

* cited by examiner

*Primary Examiner*—Ninh H. Nguyen
(74) *Attorney, Agent, or Firm*—Oblon, Spivak, McClelland, Maier & Neustadt, P.C.

(57) ABSTRACT

The invention provides a device for holding strip sealing gaskets on a turbomachine nozzle, the nozzle being constituted by a plurality of sectors having guide vanes which extend between inner and outer platforms elements, at least one of said platform elements having a sealing strip (30) disposed radially in a space between said platform element and an adjacent structural element in order to provide fluid tightness between said elements, the corresponding strips of two adjacent sectors touching, and their joint being covered by a joint cover (31) disposed between said strips, and by a holding member for holding said strips in the sealing position.

18 Claims, 3 Drawing Sheets

DEVICE FOR MAINTAINING JOINTS WITH SEALING LEAVES

The invention relates to the problem of providing sealing in a turbomachine between an aerodynamic stream conveying hot gas and an enclosure for feeding cooling air to a nozzle, for example.

More precisely, the invention relates to a device for holding strip gaskets to a nozzle interposed axially between two structural elements, said nozzle being constituted by a plurality of sectors having guide vanes which extend between inner and outer platform elements, at least one of said platform elements including a sealing strip disposed radially in a space between said platform element and an adjacent structural element in order to provide fluid tightness between said elements, the strips corresponding to two adjacent sectors touching, and their join being covered by a joint cover disposed between said touching strips and a member for holding said strips in the sealing position.

Strip sealing devices are commonly used for providing fluid tightness between the stream of hot gas delivered by the combustion chamber and the annular enclosures inside and outside the combustion chamber and conveying a flow of air for cooling the nozzles and the moving blades.

The strips are disposed in annular spaces between the platform elements and a structural element, and in the sealing position they bear against generator lines of said elements.

These strips are subjected to the pressures that exist on both of their faces. In general, the pressure of the cooling gas is higher than the pressure of the hot gas, and the strips are disposed in such a manner that the pressure difference acts favorably on the looked-for sealing. Nevertheless, since airplane turbomachines are subjected to a very wide variety of operating conditions, numerous problems can arise, in particular due to expansion and vibration, and to small differences of pressure during certain stages of flight.

That is why the sealing devices include bias means for continuing urging the strips into the sealing position.

Thus, FR 2 649 463 describes a strip sealing gasket in which the strips are slidably mounted on axial pins and are loaded by springs each including a portion mounted on the drift pin.

FR 2 786 222 describes strip-holding brackets each having one end bearing against a sealing strip and a second end curved into a hairpin shape and engaged in a groove of one of the structural elements so as to provide axial positioning. The strips and the holding brackets have curved tabs so that the brackets also position the strips axially. That document provides for a holding bracket supported by two adjacent nozzle sectors so as to press on a joint cover.

In those two embodiments, the elastic elements act on the strip carried by the sector on which the spring or the holding bracket is mounted.

The holding device of the invention is characterized by the fact that it is constituted by a tab carried by each sector and extending circumferentially at the periphery of said sector, the free end of said tab bearing against the joint cover in an annular zone outside said sector.

The tab is preferably held on the sector by two angularly offset connections. One of the connections is advantageously capable of sliding circumferentially.

This disposition makes it possible to limit angular displacements of the tab and to control the position of its bearing point.

The connections are preferably provided by axial rivets whose shanks pass through openings formed in the tab. The strips are also slidably mounted on the shanks of the rivets.

The slidable connection is preferably placed at the end of the tab remote from its free end, and it is fixed axially. In contrast, the other connection of the tab is provided by a hairpin system which continuously urges the tab towards the strip.

Other advantages and characteristics of the invention appear on reading the following description made by way of example and given with reference to the accompanying drawings, in which.

Figure 1:
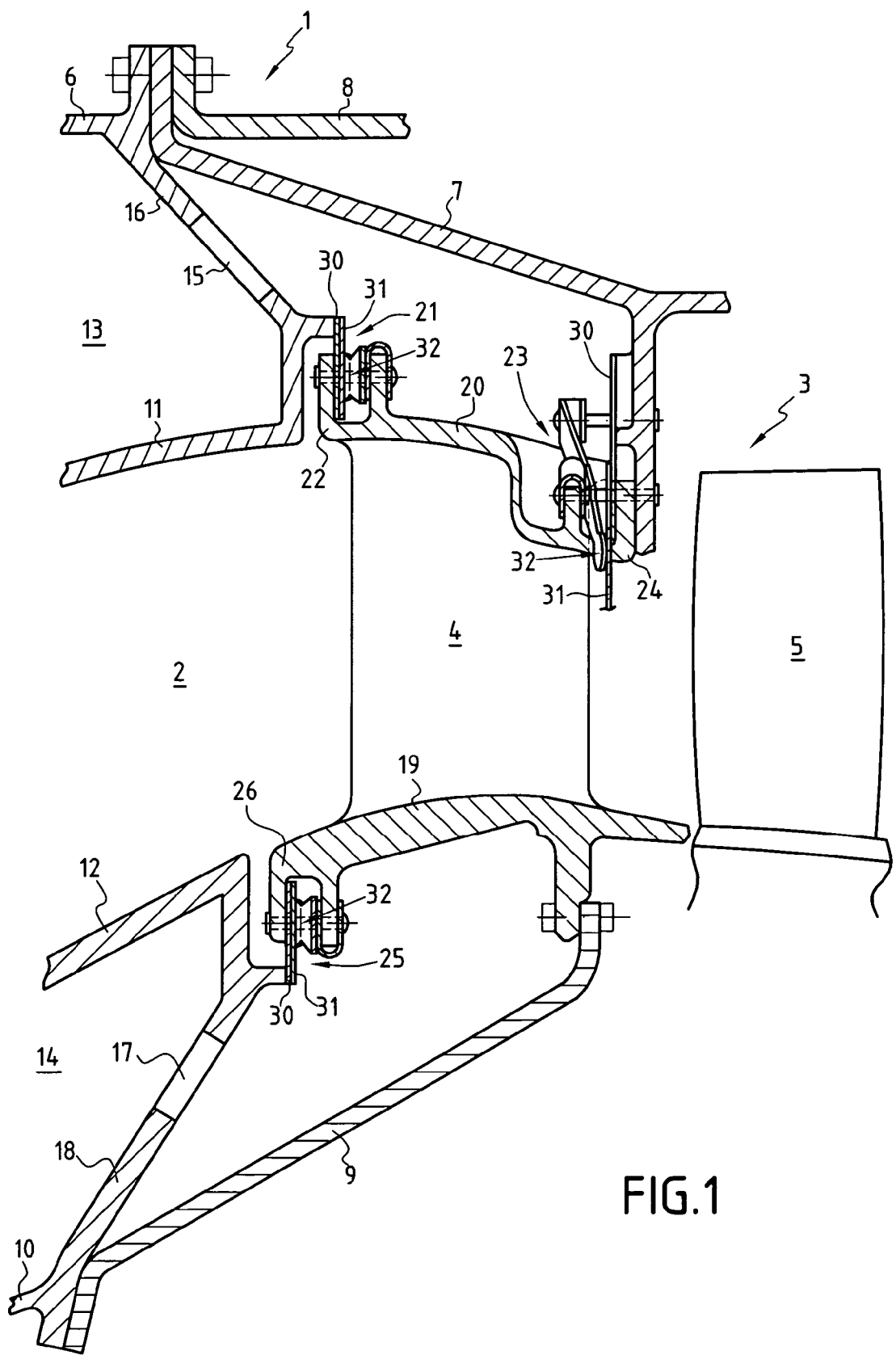
FIG. 1 is a section view of a portion of a turbomachine showing an example of the environment in which the sealing device of the invention can be used.

The turbomachine 1 shown in FIG. 1 has a combustion chamber 2 followed by a high pressure turbine 3 made up of one or more stages. Each stage of the turbine comprises a row of guide vanes 4 and a row of moving blades 5 disposed in alternation in conventional manner. The high pressure turbine is supported by a structure comprising, on its radially outer side, an outer casing 6 of the combustion chamber, an outer ring 7 of the turbine, and a turbine casing 8 interconnected by bolts. On the radially inner side of the turbine 3, an inner casing 9 of the turbine is connected to an inner casing 10 of the combustion chamber. The combustion chamber 2 is annular and is defined by an outer jacket 11 and an inner jacket 12. In conventional manner, high pressure cooling air flows around the annular combustion chamber 2, in the outer annular enclosure 13 defined by the outer casing 6 and the outer jacket 11 of the combustion chamber 2, and in the inner annular enclosure 14 defined by the inner casing 10 and the inner jacket 12 of the combustion chamber 2. The cooling air flows downstream through orifices 15 formed in the wall 16 connecting the downstream ends of the outer casing 6 to the outer jacket 11 of the combustion chamber 2 so as to cool the guide vanes 4, and through orifices 17 formed through in the wall 18 interconnecting the downstream ends of the inner casing 10 and of the inner jacket 12 of the combustion chamber 2 so as to cool the inner platforms 19 of the guide vanes 4.

In conventional manner, the row of guide vanes 4 is built up from one-piece sectors S each comprising a plurality of guide vanes 4 interconnecting an outer platform element 20 and an inner platform element 19. It is necessary to avoid any air leaking between the platform elements 19, 20 of the sectors S and the adjacent structural elements.

Thus, a first sealing gasket is interposed in the space 21 between the upstream ends 22 of the outer. platform elements 20 and the wall 16, in the space 23 between the downstream ends 24 of the outer platform elements 20 and the outer ring 7 of the turbine, and in the space 25 between the upstream end 26 of the inner platform 19 and the wall 18.

Each of these gaskets is constituted by a plurality of curved and touching strips 30 each carried by a nozzle sector S and bearing against respective shoulders 40 formed in the sector S at the upstream and downstream ends 22 and 24 of the outer platform element 20 and at the upstream end 26 of the inner platform element.19. These strips 30 extend radially outwards for the strips that close the spaces 21 and 23, and they extend radially inwards for the strips 30 that close the space 25, and that have generator lines bearing against the adjacent structural element.

Figure 2:
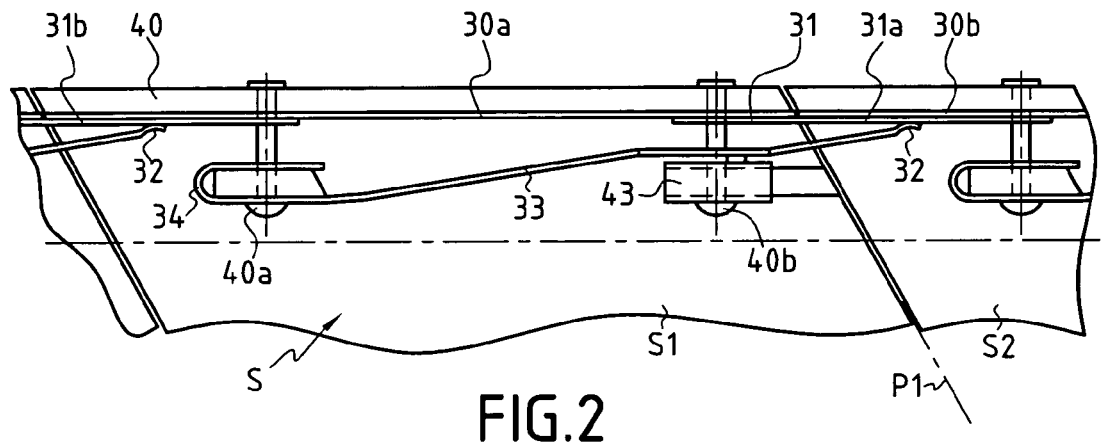
FIG. 2 is a radial plan view of the device for holding the strips of two adjacent sectors of a nozzle.

Two adjacent strips 30a, 30b in the same gasket touch each other in the plane P1 separating two consecutive sectors S1 and S2. As can be seen in FIG. 2, the joint between these two strips 30a and 30b is covered by a joint cover 31 interposed between the adjacent ends of these strips and a member 32 urging the gasket into its sealing position.

Figure 3:
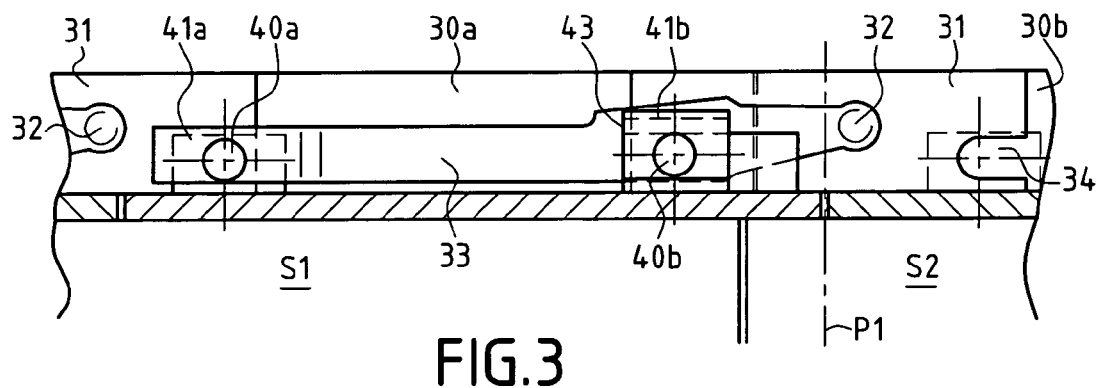
FIG. 3 is a developed axial view of the FIG. 2 holding device.

The holding member 32 is the free and rounded end of a holding tab 33 secured to one of the sectors, e.g. S1, by means of two rivets 40a and 40b that are fixed to respective bulges 41a and 41b of a platform element 19 or 20. The shanks of these rivets pass through orifices formed to coincide in the holding tab 33, the strips 30a, and the joint covers 31a and 31b. The end 34 of the tab 33 remote from the free end 32 is curved into a U-shape and has two cylindrical orifices 50a, 50b so as to provide a connection that is stationary circumferentially, because of said end 34 being held in position axially. The connection between the rivet 40b and the tab 33 is provided by a hairpin-shaped device 43 which urges the middle portion of the tab 33 towards the strip 30a, this connection being free circumferentially. As shown in FIG. 3, the tab 33 extends circumferentially over the platform element of sector S1, but the free end 32 which presses against the joint cover 31a lies outside the sector S1, and in the example shown in FIGS. 2 and 3 in the angular zone occupied by the sector S2. In FIG. 3, it can be seen that the joint cover 31 has opposite notches 35 at its ends through which there pass the shanks of adjacent rivets that are carried by two adjacent sectors S1 and S2.

Figure 4:
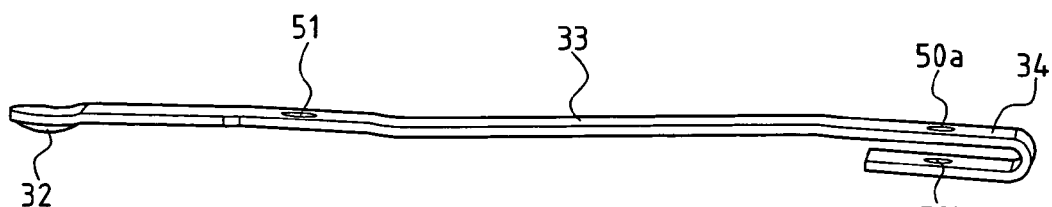
FIG. 4 is a perspective view of the holding tab of the invention.

FIG. 4 is a perspective view of a holding tab 33. The branches of its end 34 include cylindrical orifices 50a and 50b in alignment through which the shank of the rivet 40a passes. This figure also shows the oblong orifice 51 through which the shank of the rivet 40b passes so as to provide a circumferentially slidable connection.

Figure 5:
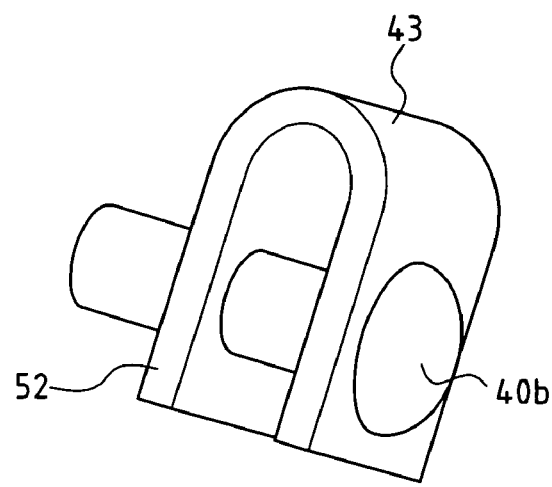
FIG. 5 is a perspective view of the rivet and hairpin fastener device for the FIG. 4 tab.

FIG. 5 shows the rivet 40b, and the hairpin which is placed astride the bulge 41b, the portion 52 of the hairpin 43 pressing against the middle portion of the tab 33 which surrounds the orifice 51.

Figure 6:
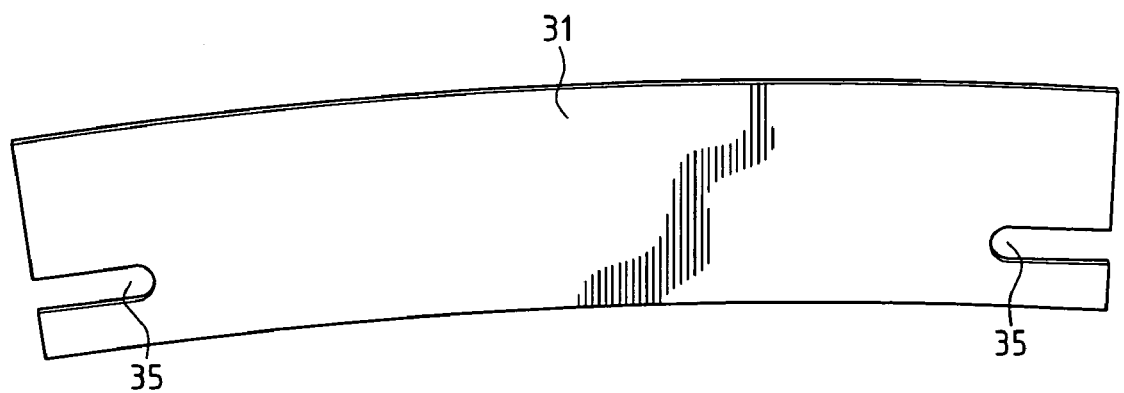
FIG. 6 is an axial view of a joint cover.

FIG. 6 shows a joint cover 31 for covering the adjacent ends of two neighboring strips 30a and 30b. The ends of the joint cover 31 have opposite notches 35 receiving the shanks of two adjacent rivets 40a and 40b mounted on two adjacent sectors.

The invention claimed is:

1. A turbomachine including a nozzle interposed axially between two structural elements, said nozzle being made up of a plurality of sectors having guide vanes which extend between inner and outer platform elements, at least one of said platform elements including a sealing strip disposed radially in a space between said at least one platform element and an adjacent structural element so as to provide fluid tightness between said elements, the corresponding strips of two adjacent sectors touching and their joint being covered by a joint cover disposed between said strips and by a holding member for holding said strips in the sealing position, wherein the holding member comprises a tab carried by one sector and extending circumferentially at the periphery of said sector, the free end of said tab bearing against the joint cover in an angular zone outside said sector, wherein the joint cover is urged against said sealing strip by the holding member.

2. A turbomachine according to claim 1, wherein the tab is held on the sector by two angularly offset connections.

3. A turbomachine according to claim 2, wherein one of the connections is capable of sliding circumferentially.

4. A turbomachine according to claim 1, wherein each holding member urges the joint cover at a point angularly externally of the strip to which the joint cover is attached.

5. A turbomachine including a nozzle interposed axially between two structural elements, said nozzle being made up of a plurality of sectors having guide vanes which extend between inner and outer platform elements, at least one of said platform elements including a sealing strip disposed radially in a space between said at least one platform element and an adjacent structural element so as to provide fluid tightness between said elements, the corresponding strips of two adjacent sectors touching and their joint being covered by a joint cover disposed between said strips and by a holding member for holding said strips in the sealing position, wherein the holding member comprises a tab carried by one sector and extending circumferentially at the periphery of said sector, the free end of said tab bearing against the joint cover in an angular zone outside said sector, wherein the tab is held on the sector by two angularly offset connections, wherein one of the connections is capable of sliding circumferentially, and wherein the connections are provided by axial rivets passing through openings formed in the tab.

6. A turbomachine according to claim 5, wherein the sliding connection is provided by a hairpin system continuously urging said tab towards the strip.

7. A turbomachine according to claim 6, wherein the other connection of the tab is disposed at the end of the tab remote from its free end and is axially fixed.

8. A turbomachine according to any one of claims 5 to 7, wherein the joint cover has opposite notches at its ends, and said notches have neighboring rivets of two adjacent sectors passing therethrough.

9. A turbomachine comprising:
a turbomachine structural element;
a platform; and
a sealing gasket between said structural element and said platform, wherein said sealing gasket comprises:
two adjacent strips touching each other and forming a joint,
a joint cover configured to cover said joint, and
a tab having an end which bears against said joint cover so as to urge said joint cover against adjacent ends of said strips into a sealing position.

10. A turbomachine according to claim 9, wherein the end of said tab bears against the joint cover in an angular zone outside a sector for said platform.

11. A turbomachine according to claim 9, wherein the tab is held on a sector by connections.

12. A turbomachine according to claim 11, wherein one of the connections is capable of sliding circumferentially.

13. A turbomachine according to claim 11, wherein the connections are provided by axial rivets.

14. A turbomachine according to claim 13, wherein the axial rivets pass through openings formed in the tab.

15. A turbomachine according to claim 9, wherein the tab is held on a sector by two connections.

16. A turbomachine according to claim 15, wherein said two connections are angularly offset.

17. A turbomachine according to claim 9, wherein said tab extends circumferentially over the platform.

18. A turbomachine according to claim 9, wherein said tab has a second end curved into a U-shape.

* * * * *